United States Patent [19]
Spatz

[11] 3,716,141
[45] Feb. 13, 1973

[54] SOLVENT SEPARATING APPARATUS
[75] Inventor: Donald Dean Spatz, Minnetonka, Minn.
[73] Assignee: Osmonics, Inc., Minneapolis, Minn.
[22] Filed: Feb. 1, 1971
[21] Appl. No.: 111,189

[52] U.S. Cl. ................. 210/194, 210/321, 210/433
[51] Int. Cl. ............................................. B01d 31/00
[58] Field of Search........ 210/23, 194, 137, 134, 321, 210/433, 409

[56] References Cited

UNITED STATES PATENTS

| | | | |
|---|---|---|---|
| 2,928,499 | 3/1960 | Hallinger | 210/134 X |
| 3,457,170 | 7/1969 | Havens | 210/23 |
| 3,505,216 | 4/1970 | Kryzer | 210/134 X |
| 3,364,667 | 2/1968 | Clark et al. | 210/194 X |
| 3,493,445 | 2/1970 | Mendelson | 210/409 X |

OTHER PUBLICATIONS

"Reverse Osmosis Systems," a publication of Osmonics, Inc., 6 pages.
Gouveia et al., "Potable Water From Hospital Wastes By Reverse Osmosis," from Chem. Eng. Progress Symposium Series, 1968, pages 280–284.

*Primary Examiner*—Frank A. Spear, Jr.
*Attorney*—Frederick E. Lange, William C. Babcock and David N. Fronek

[57] ABSTRACT

A solvent separating apparatus for purifying a solution by exposing said solution, under pressure, to a solvent separating means including a non-positive displacement pump for elevating the pressure of said solution prior to direction into said solvent separating means and means including two presized orifices for maintaining the desired pressure and desired flow rate of said solution through said solvent separating means and for flushing said solvent separating means periodically without the necessity of further adjustments in order to return the system to normal operating conditions.

10 Claims, 3 Drawing Figures

PATENTED FEB 13 1973
3,716,141
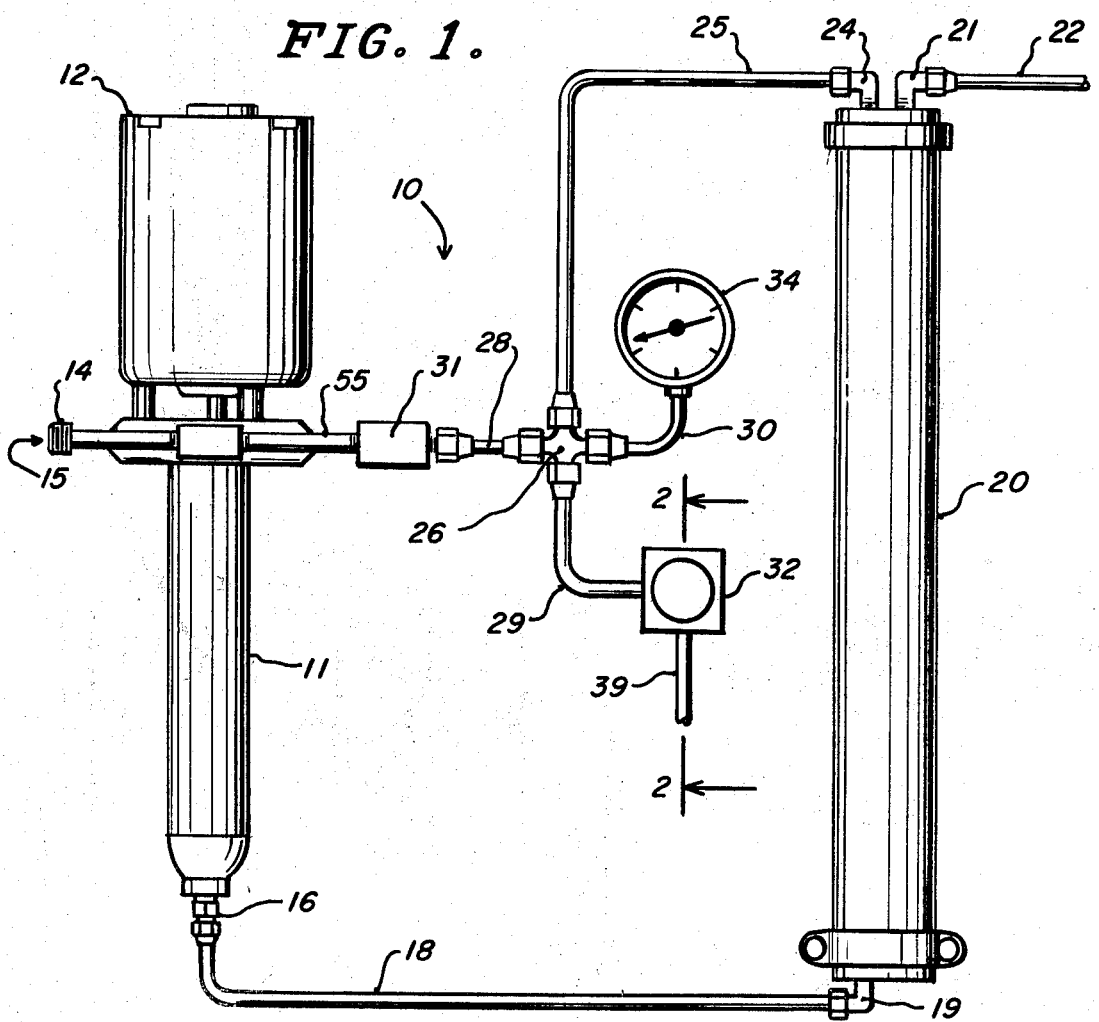
FIG. 1.
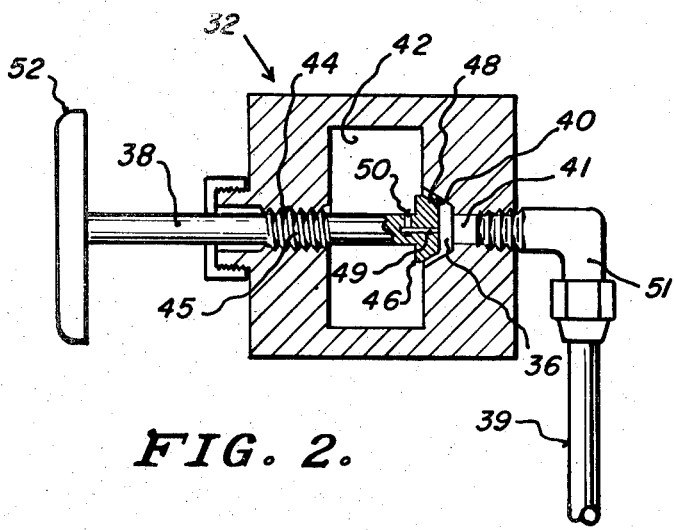
FIG. 2.
FIG. 3.
INVENTOR
Donald Dean Spatz
BY David N. Fronek
ATTORNEY 3,716,141

SOLVENT SEPARATING APPARATUS

BACKGROUND OF THE INVENTION

The present invention relates generally to a solvent separating apparatus, and more specifically, to a reverse osmosis apparatus in which the flow rates and pressures of the system are set during fabrication. Under these particular conditions the system is capable of being operated and the reverse osmosis membrane capable of being flushed without the adjustment of flow rates or pressures by the machine's operator.

The solvent separating apparatus embodying the present invention is used primarily for purifying water by removing flourides, bacteria, virus, pyrogens, and other impurities for use both industrially, medically, and domestically. It is understood, however, that the use of this apparatus is not to be limited to such uses, but can be used whenever a solution is desired to be separated.

A typical reverse osmosis apparatus embodying the present invention includes a solvent separating means, a pump for pumping a solution under pressure through this means, means for collecting the permeate or solvent (pure water) separated by said separating means, and means for recycling back through a portion of the solute or solution not so separated. This latter means, in prior art solvent separating apparatus, usually included a recirculation control valve, a recirculation flow meter, a concentrate control valve, a concentrate flow meter and a pressure gauge associated with each. In many cases, the past machines also had back pressure regulators and pressure accumulators or surge tanks to effect the proper recirculation of the solute or concentrate. These past machines also required an experienced operator who was trained to adjust the recirculation valve and concentrate valve while watching the respective flow meters and pressure regulators. It was often a difficult task to obtain the proper balance between the concentrate which was recycled and the concentrate which was removed from the system, because vibration often tended to change the relative settling on the valve, thereby requiring the operator to perform the adjustment function quite frequently.

In some past machines extensive electrical feedback controls and pneumatic back pressure controls were implemented in order to eliminate need for close operator surveillance. Such machines, however, were complex and fragile and required a considerable down time for control adjustments.

A further problem existing in all reverse osmosis or solvent separating equipment is the reduction in efficiency of the system due to the precipitation of foreign materials within the equipment. These foreign materials tend to coat the membrane or fibers and thereby reduce the rate of solvent permeation through the equipment. Some past machines used detergents and acid in an attempt to remove the materials which had been coated onto the membranes while others used separate pumping systems to periodically pump the solution at a higher flow rate over the membrane. Both of these methods, however, were limited in that they involved added expense of operation to the system since detergents and acid had to be consumed periodically or a separate pumping system had to be installed. The latter method was additionally cumbersome and inefficient since, after the auxiliary pumps had flushed the membrane, an experienced operator had to again adjust the valves to obtain the desired flow rate.

SUMMARY OF THE INVENTION

In contrast to the reverse osmosis and solvent separating equipment of the past which has been described above, the present invention is a reverse osmosis or solvent separating apparatus which eliminates the need for an operator to set flow rates or pressures. Further, the present invention does not require any electrical controls or operations and has only one pressure gauge which gives the operator information on the flow rate and pressure for both the solute or concentrate removed from the apparatus, the recirculated solute or concentrate, and the solution flowing through the solvent separating means.

To solve the problem of the precipitation of foreign materials on the membrane or fiber surfaces, the present invention allows for flushing these surfaces on a periodic basis at a high flow rate without any additional pumps or chemicals. The present invention provides a flush valve which is either manually or automatically opened and which in many cases is the same valve which controls the concentrate which is exited from the system. With the present invention, the system can be flushed and then returned to proper adjustment and normal operating conditions with no more than the rotation of a valve stem.

The specific construction of the apparatus of the present invention includes a reverse osmosis module or means including a semi-permeable membrane, a non-positive displacement pump for pumping a solution, under pressure, over the surface of this membrane, a means for actuating the centrifugal pump, and a flow divider directing the concentrate flow into two presized orifices whereby a portion of the concentrate is recycled and a portion exited from the system. Additionally, the presized orifice which removes concentrate from the system includes a flush valve which can be opened to permit a flow rate of about 2–4 times the ordinary flow rate over the membrane in order to flush the membrane and remove any precipitated foreign materials from the surface. When the flushing has been completed, the flush valve is closed, and the equipment returns to normal operation without further adjustment by the operator.

With this construction, it is impossible for the operator to improperly adjust the equipment since no adjustments are necessary. Consequently, the operator does not have to be specially trained for this type of adjustment. Furthermore, the construction of the apparatus of the present invention is such that it is impossible to close the system down while the centrifugal pump is still operating. Therefore, with the present invention, there can be no burnout of the pump, or rupture of the reverse osmosis membrane, due to an improper adjustment of the system.

In accordance with the specific structure described below, it is an object of the present invention to provide a solvent separating apparatus in which the proper flow rate and pressure of the solution is maintained at all times without adjustment by an operator.

It is also an object of the present invention to provide a solvent separating apparatus in which the operator can constantly be assured that the proper flow rate of the solution over the membrane or fibers is maintained, and that the proper recovery of permeate as a percentage of the feed solution is maintained.

It is also an object of the present invention to provide a solvent separating apparatus which will be ready to operate on installation with no operator adjustment required.

A further object of the present invention is to provide a solvent separating apparatus which can be flushed to remove precipitated foreign material from the membrane or fiber surfaces without the use of additional chemicals or detergents or without the installation of additional pumping equipment.

Still another object of the present invention is to provide a solvent separating apparatus in which the membrane or fibers can be flushed by passing solution over their surfaces at a flow rate several times greater than the normal operating flow rate, and wherein the apparatus can again be returned to an operable position by closing off the flush valve without further adjustment by the operator.

DESCRIPTION OF THE DRAWINGS

FIG. 1 is a front elevated view of the solvent separating apparatus of the present invention.

FIG. 2 is a partial sectional view of the flush valve taken along line 2—2 of FIG. 1.

FIG. 3 is an enlarged partial sectional view of the recirculation orifice assembly.

DESCRIPTION OF THE PREFERRED EMBODIMENT

Referring first to FIG. 1, the solvent separating apparatus 10 of the present invention includes a centrifugal pump 11 for elevating the pressure of a fluid 15 entering the pump 11 through the inlet 14. The pump 11 is driven by an electric pump motor 12, although it is recognized that other forms of energy such as steam turbines and gasoline or diesel engines can be used in place of the electric motor. For purposes of the preferred embodiment of the invention, the electric motor is a conventional three horsepower, 3,450 rpm, three phase, 220/440 volt motor. Although the preferred embodiment shows the pump 11 to be a centrifugal pump, other types of pumps may be used to pressurize the solution entering the inlet 14. However, it is necessary for the pump to be a non-positive displacement type pump. For purposes of this specification, a non-positive displacement pump is defined as a pump in which the inlet and outlet are connected hydraulically so that the fluid being pumped can recirculate in the pump when pressure builds up. Because of these characteristics, each non-positive displacement pump has a "pressure versus flow" curve which is specific to that particular pump.

The feed solution 15 which contains a certain concentration of undesired impurities enters the system through the inlet to the pump 14. While in the pump 11, the solution 15 is elevated in pressure before being exited at the outlet 16. The pressurized solution is then conducted via the conduit 18 to the inlet 19 which leads into a reverse osmosis module 20 which separates the feed solution 15 into a solvent or permeate (low concentration of impurities) and a concentrate or solute (high concentration of impurities). Although the module 20 of the preferred embodiment is of the spiral configuration type, this module can also be of the tubular type or hollow fiber type. This configuration contains a reverse osmosis membrane in which the efficiency of the solvent permeation through this membrane and the solute or concentrate rejection by this membrane is based upon the mass transfer of solute from the surface of the membrane. Turbulent or quasi-turbulent flow over the membrane will increase mass transfer thereby improving solvent permeation through the membrane and solute rejection from the surface of the membrane. Consequently, the efficiency of a particular type of module being used will depend to some extent on both the type of membrane configuration and the flow rate over that membrane. From empirical data, optimum flow rates have been determined for various types of membrane configurations.

The pressurized solution which enters the module 20 at the inlet 19 is then allowed to flow over the membrane within the module 20. A portion of that solution (the permeate or solvent) is forced, by the pressure under which the system is operated, through the membrane and is exited from the module 20 through the outlet 21 and the conduit 22. This liquid is virtually free of all dissolved salts and impurities in the case of reverse osmosis.

The portion of the pressurized solution entering the module 20 which does not pass through the membrane is exited from the module 20 at the outlet 24. This solution contains a substantially greater amount of dissolved salt and impurities than either the feed solution 15 or the permeate exited at the outlet 21 and is conducted via the conduit 25 to a flow divider 26. In the preferred embodiment, the flow divider 26 is a cross-tee which directs the flow from the conduit 25 into three conduits 28, 29 and 30. The flow directed into the conduit 28 is conducted by the conduct 28 into the recirculation orifice assembly 31 for eventual recycling through the system, the flow directed into the conduit 29 is conducted by the conduit 29 into the flush valve 32, and the flow directed into the conduit 30 is conducted by the conduit 30 to a pressure gauge 34 which indicates the pressure of the solution within the system when the system is at equilibrium.

Referring next to FIG. 2, the flush valve 32 generally includes a housing 35 and a valve arrangement 36 which controls the flow of the concentrated solution from the conduit 29 into the conduit 39. More specifically, the housing 35 includes a valve seat 40 having a generally conical surface, a bore 41, a portion of which is threaded, extending from the valve seat 40 to the external surface of the housing 35, a chamber 42 in communication with the conduit 29, and a threaded bore 44 corresponding to a threaded portion 45 of a valve stem 38.

On one end of the valve stem 38 is a valve member 46 which includes a conical surface 48 corresponding generally to the conical surface of the valve seat 40, a concentrate orifice 49 extending axially through the valve stem 38 for a limited distance from the end of the stem 38 adjacent to the bore 41, and a hole 50 perpendicular to the concentrate orifice 49 extending radially outwardly from the center of the valve stem 38 to the chamber 42. In this manner the chamber 42, and thus the conduit 29, is in direct communication, via the hole 50 and the concentrate orifice 49, with the bore 41. The conduit 39 is connected with the bore 41 by the threaded outlet member 51.

A knob 52 is positioned on the end of the valve stem 38 which extends outwardly from the housing 35. By rotating the nob 52, the stem 38 is correspondingly rotated to effect movement, via the threaded bore of the housing 44 and the threaded portion of the stem 45, of the stem 38 and thus the valve member 46 and the conical surface 48 into and out of contact with the conical valve seat 40. When the knob 52 is turned so that the valve stem 38 advances into the housing 35 the conical surface 48 of the valve member 46 will contact the valve seat 40 thereby preventing any concentrate solution to flow from the chamber 42 through the area between the surface 48 and the seat 40 and into the conduit 39. When the valve is in this position, however, a small amount of the concentrated solution is allowed to exit from the chamber 42, through the hole 50 and the concentrate orifice 49, into the conduit 39. As will be described below, this flow is controlled by the size of the concentrate orifice 49 and the pressure in the system indicated by the pressure gauge 34 (FIG. 1). When the knob 52 is turned in the opposite direction so that the valve stem 38 is retracted from the housing 35, the valve member 46 and thus the conical surface 48 is moved away from the valve seat 40 thereby allowing the concentrate solution in the chamber 42 to flow from the chamber 42 through the opening between the surface 48 and the seat 40 and into the conduit 39 at a much greater rate than if the surface 48 was in contact with the seat 40.

The purpose of the flush valve 32 in the present invention is to be able to restrict the flow of the concentrate solution from the conduit 25 and thus the conduit 29 to the conduit 39 when such restriction is desired, but to also be able to cause the flow rate through these conduits to be increased several times when such a condition is desired. As described below, the increase in flow rate is periodically necessary to flush the system and maintain the reverse osmosis membrane in an efficient, operable condition.

Referring to FIG. 3, the recirculation orifice assembly 31 includes a nipple 56, a stainless steel plug 58 which is press fit within the nipple 56, and a recirculation orifice 59 contained within the plug 58. Similar to the concentrate orifice 49 of FIG. 2, the recirculation orifice 59 is presized to restrict the flow of concentrated solution from the conduit 28 and thus the conduit 25 into the conduit 55. The concentrated solution which passes through the orifice 59 is conducted via the conduit 55 back into the centrifugal pump 11 (FIG. 1) where it is mixed with the incoming solution 15 and recirculated through the entire system.

The purpose of both the concentrate orifice 49 (FIG. 2) when the valve stem 38 is axially positioned so that the surface 48 is in contact with the valve seat 40, and the recirculation orifice 59 (FIG. 1) is to provide a restriction so that sufficient pressure can build up on the membrane of the module 20 in order to effect the passing of some of the permeate or solvent through the membrane. After a certain period of operation, however, the surface of the membrane becomes coated with impurities and salts which have been separated from the solution. When this situation occurs, the impurities and salts must be flushed from the surface of the membrane to maintain the membrane in an efficient, operable condition. When flushing of the system is desired, the knob 52 is rotated so that the valve stem 38 is retracted and the conical surface 48 is moved away from the valve seat 40 thereby allowing the solution to flow from the chamber 42, and thus the conduit 29 and 25, into the conduit 39 at a flow rate substantially greater than the normal flow rate through the orifice 49. This increased flow rate causes turbulent conditions to exist over the surface of the membrane and causes the impurities and separated salts to be flushed from the surface of the membrane, thereby cleaning the membrane. When the flush has been completed, the knob 52 is rotated in the opposite direction so that the valve stem 38 is advanced into the housing 35 and the surface 48 is again in contact with the valve seat 40. The entire system then returns to equilibrium and normal operating conditions.

One of the primary advantages of this entire system is that both the recirculation orifice 59 and the concentrate orifice 49 are presized so that a layman can flush the system, when flushing is necessary, and can then return the system to normal operating conditions merely by closing the flush valve.

Since the centrifugal pump 11 has certain operating characteristics and the module 20 has certain conditions under which it operates most efficiently, and since a certain recovery of solvent or permeate as a percentage of the feed solution is often desired, each of the orifices 49 and 59 must have a certain absolute size and a certain size relationship with respect to each other. Consequently, it is very important to the operation of the present invention to be able to properly calculate the sizes of the presized orifices 49 and 59 so that all of the desired conditions are met.

The equation used in calculating the orifice sizes is as follows:

$$D = \left( \frac{8 Q^2 \rho K}{\pi^2 \Delta P g_0} \right)^{-4} \quad \text{Equation 1}$$

where:
  $K$ is a dimensionaless empirically calculated constant of the resistance to flow in the orifice,
  $D$ is the diameter of the orifice,
  $Q$ is the flow rate through the orifice,
  $\rho$ is the density of the solution,
  $\Delta P$ is the pressure drop across the orifice, and
  $g_c$ is the gravitational constant.

By knowing the desired conditions under which the pump 11 and the module 20 are to operate and knowing the characteristics of the module 20 and the recovery of the solvent as a percentage of the feed solution, Equation 1 can be used to determine the diameter of each of the orifices 49 and 59. For example, given specifications that:

1. The centrifugal pump 11 will pump 5 gallons per minute at 400 psig,
2. The membranes in the module 20 require a flow rate of at least 4 gallons per minute over their surface to maintain good mass transfer and to operate efficiently,
3. The permeate rate of solvent through the membrane of the module 20 at 400 psig is 1 gallon per minute, and 4. A desired recovery of solvent as a percentage of the feed solution is 66 ⅔ percent, the sizes of the orifices 49 and 59 can be calculated.

First of all, it can be determined that the feed solution 15 into the inlet 14 must be 1.5 gallons per minute by the fact that 1 gallon per minute is leaving the system as solvent and by the desire that the solvent recovery as a percentage of the feed solution be 66 ⅔ percent. Now, since 1.5 gallons per minute is entering the system at the inlet 14 and 1 gallon per minute is leaving the system as solvent through the conduit 22 and since a material balance must be maintained in the system, the concentrate solution exiting from the system through the conduit 39 must exit at a flow rate of 0.5 gallons per minute. Further, since the solution must flow over the surface of the membrane at the rate of 4 gallons per minute to maintain good mass transfer and to operate efficiently, and since 1 gallon per minute is permeated through the membrane, then it can be determined that the solution must enter the module 20 at the inlet 19 at the rate of 5 gallons per minute. Because it has already been determined that 0.5 gallons per minute will exit from the system through the concentrate orifice 49, it can be calculated that 3.5 gallons per minute must be recycled through the recirculation orifice 49. Now using Equation 1 and the known characteristics of the solution and the flow rates necessary through the orifices 49 and 59, the size of the respective orifices can be calculated. For the specific situation described above as an example, it is calculated that the concentrate orifice 49 must be 0.29 inches in diameter and the recirculation orifice 59 must be 0.089 inches in diameter. Once the orifice sizes are known, the entire system can be constructed and sold in a condition which is ready for operation upon installation.

Although the present invention has been described in some detail, the general operation of the present invention can be summarized as follows. First of all, the centrifugal pump 11 is actuated by the motor 12 so that it pressurizes the feed solution 15 to the desired pressure whereupon it is exited from the pump at the outlet 16 and conducted via the conduit 18 to the reverse osmosis module 20. Within the module 20, the pressurized solution is exposed to one side of a reverse osmosis membrane with a portion of the fluid (the permeate or solvent) passing through the membrane and exiting from the system through the conduit 22. The remainder of the solution passes over the membrane and exits from the module 20 at the outlet 24 and is conducted via the conduit 25 to the flow divider 26. From here, a portion of this concentrated solution is conducted via the conduit 29 into the flush valve 32 where a portion flows through the presized concentrate orifice 49 (FIG. 2) and is exited from the system by the conduit 39. The remaining portion of the concentrated solution flows through the presized recirculation orifice 59 (FIG. 3) and is conducted via the conduit 55 back into the pump 11 where it is recycled through the system. When equilibrium conditions have been met, the pump 11 and the module 20 will be operating at their most efficient level, and the amount of solvent exiting through the conduit 22 will be the desired percentage of the feed solution 15 entering the system through the inlet 14.

After a certain period of operation, usually about 1 to 2 weeks, a deposition of impurities and separated salts begins to accumulate on the surface of the membrane within the module 20. At this time, it is necessary to flush the system to remove these impurities. To do this, the operator rotates the knob 52 so that the valve stem 38 and thus the conical surface 48 is moved away from the valve seat 40, thereby allowing the solution to flow from the chamber 42, and thus the conduits 25 and 29, into the conduit 39 and out of the system at a substantially greater flow rate. Under these conditions, the impurities which have collected on the surface of the membrane are flushed out of the system. When the flushing is complete, the operator rotates the knob in the opposite direction in order to bring the conical surface 48 in contact with the valve seat 40. When this is done, the system returns to equilibrium and no further adjustment is required by the operator.

Although the description of the present invention has been quite specific, it is understood by the applicant that there are many alternative embodiments of the present invention which can be constructed without deviating from the spirit of the invention. Consequently, the scope of the present invention should be dictated by the appended claims rather than by the description of the preferred embodiment.

I claim:

1. An ultrafiltration apparatus for separating the solvent from a feed solution by exposing said feed solution, under pressure, to a solvent separating means comprising:

a non-positive displacement pump for elevating the pressure of a feed solution;

means for supplying said feed solution to said non-positive displacement pump;

a solvent separating means for separating said feed solution into a solvent and a more concentrated solution;

means for conducting the pressurized feed solution from said pump to said solvent separating means;

means for removing said solvent from said solvent separating means;

means for insuring a desired pressure in and a desired flow rate through said solvent separating means in relationship to the characteristics of said pump including a presized recirculation orifice for directing a portion of said more concentrated solution from said solvent separating means into said pump for recirculation through the apparatus and a presized concentrate orifice for directing a portion of said more concentrated solution from said solvent separating means out of the apparatus, said presized recirculation orifice and said presized concentrate orifice having sizes which restrict the flow of said more concentrated solution from said solvent separating means to the extent that the desired pressure of said feed solution in said solvent separating means and the desired flow rate through said solvent separating means are maintained, and said presized recirculation and concentrate orifices having sizes with respect to each other such that the recovery of said solvent as a percentage of said feed solution is that which is desired; and means for periodically flushing the apparatus by causing said feed solution to flow through said solvent separating means at a flow rate substantially greater than said desired flow rate.

2. The solvent separating apparatus of claim 1 wherein said non-positive displacement pump is a centrifugal pump.

3. The solvent separating apparatus of claim 2 wherein said centrifugal pump is a multistage centrifugal pump.

4. The solvent separating apparatus of claim 1 wherein said solvent separating means includes a reverse osmosis membrane of a spirally wound design.

5. The solvent separating apparatus of claim 1 and a pressure gauge for indicating the pressure of said more concentrated solution.

6. The solvent separating apparatus of claim 1 wherein said presized concentrate orifice is integrally formed within said means for periodically flushing the apparatus.

7. The solvent separating apparatus of claim 6 wherein said means for periodically flushing the apparatus includes a valve seat, an axially movable valve stem having a corresponding portion designed to be selectively moved into and out of contact with said valve seat so that when said corresponding portion of the valve stem is in contact with said valve seat said more concentrated solution is prevented from passing between said corresponding portion and said valve seat and when said corresponding portion of the valve stem is not in contact with said valve seat said more concentrated solution can freely flow between said corresponding portion and said valve seat to flush the apparatus.

8. The solvent separating apparatus of claim 7 in which said presized concentrate orifice is an opening in said valve stem which allows a limited amount of said more concentrated solution to exit from the apparatus when said corresponding portion and said valve seat are in contact with each other.

9. The solvent separating apparatus of claim 8 wherein one end of said valve stem includes a knob which can be manually rotated to selectively move said corresponding portion into and out of contact with said valve seat.

10. The solvent separating apparatus of claim 9 and a pressure gauge for indicating the pressure of said more concentrated solution.

* * * * *